United States Patent
Naruki et al.

[19]

[11] Patent Number: 6,108,012
[45] Date of Patent: Aug. 22, 2000

[54] IMAGE DISPLAY DEVICE FOR DISPLAYING IMAGES RESPONSIVE TO NUMBER OF TIMES OF SELECTION OF IMAGE DATA BY USER

[75] Inventors: Yukio Naruki, Higashiyamato; Hiromi Okabe, Tokyo, both of Japan

[73] Assignee: Casio Computer Co., Ltd., Tokyo, Japan

[21] Appl. No.: 09/330,293

[22] Filed: Jun. 11, 1999

Related U.S. Application Data

[62] Division of application No. 08/657,018, May 28, 1996, Pat. No. 5,933,152.

[30] Foreign Application Priority Data

May 31, 1995 [JP] Japan ................................. 7-133898

[51] Int. Cl.[7] ......................................... G06F 15/00
[52] U.S. Cl. ................................. 345/501; 345/960
[58] Field of Search ........................... 345/473–475, 345/501–503, 507, 509, 515, 516, 949, 952, 956, 960, 358; 463/1, 16, 22, 30–39, 43

[56] References Cited

U.S. PATENT DOCUMENTS

| | | | |
|---|---|---|---|
| 4,181,971 | 1/1980 | Frey et al. | 708/3 |
| 5,189,402 | 2/1993 | Naimark et al. | 345/473 |
| 5,261,041 | 11/1993 | Susman | 345/473 |
| 5,289,568 | 2/1994 | Hosoya | 345/435 |
| 5,373,440 | 12/1994 | Cohen et al. | 705/14 |
| 5,453,568 | 9/1995 | Tajima et al. | 84/609 |
| 5,454,043 | 9/1995 | Freeman | 345/358 |
| 5,459,861 | 10/1995 | Oda | 707/2 |
| 5,537,662 | 7/1996 | Sato et al. | 345/435 |
| 5,542,037 | 7/1996 | Sato et al. | 345/433 |
| 5,563,988 | 10/1996 | Maes et al. | 345/421 |
| 5,572,646 | 11/1996 | Kawai et al. | 345/501 |
| 5,588,096 | 12/1996 | Sato et al. | 345/435 |
| 5,630,017 | 5/1997 | Gasper et al. | 704/276 |
| 5,718,631 | 2/1998 | Invencion | 463/19 |
| 5,734,795 | 3/1998 | Rogers | 395/10 |
| 5,734,923 | 3/1998 | Sagawa et al. | 345/302 |
| 5,787,419 | 7/1998 | Sato et al. | 707/4 |
| 5,809,267 | 9/1998 | Moran et al. | 345/358 |
| 5,886,697 | 3/1999 | Naughton et al. | 345/349 |
| 5,917,490 | 6/1999 | Kuzunuki et al. | 345/351 |
| 5,933,152 | 8/1999 | Naruki et al. | 345/501 |

*Primary Examiner*—Ulka J. Chauhan
*Attorney, Agent, or Firm*—Frishauf, Holtz, Goodman, Langer & Chick, P.C.

[57] ABSTRACT

In an image display device, a ROM contains a plurality of image data indicative of the actions of an animal character. A RAM includes a plurality of action level registers each of which stores for each image data the state of inputs given to select and display the image data. The user gives a command corresponding to a respective image of an animal character to select and display the action of the animal character optionally. When a random-number corresponding to the command is generated, image data which does not correspond to the input command can be displayed. If the generated random number has a particular value, the value of an action level register for the image data corresponding to the command is updated. Such operation is iterated and thus the value of the action level register is updated. When the user instructs the device to display the image data for which the updated value of the action level register has reached the predetermined value, the corresponding image data is displayed, so that the user can interestingly feel as if the user actually kept a pet.

8 Claims, 8 Drawing Sheets

IMAGE DISPLAY DEVICE FOR DISPLAYING IMAGES RESPONSIVE TO NUMBER OF TIMES OF SELECTION OF IMAGE DATA BY USER

This application is a division of Ser. No. 08/657,018, filed May 28, 1996.

BACKGROUND OF THE INVENTION

1. Field of the Invention

The present invention relates to image display devices and methods for displaying image data, and more particularly to an image display device and method for storing a plurality of image data and selectively displaying the plurality of image data in accordance with the user's instructions.

2. Description of the Related Art

An image display device of a conventional electronic apparatus which displays, for example, animal characters contains a plurality of displayed images depending on a character to be displayed. The image of any character to be displayed is usually moved or changed by the operation of a plurality of keys of a key-in unit.

In the image display device, the moving of a displayed character is typically performed by a selective operation of up, down, right and left cursor keys.

However, since in the conventional image display device, the respective operations of the up, down, right and left cursor keys and corresponding moves of a character are fixed, the user can interestingly feel as though the displayed character were integral with the user herself, but the user can not feel as though the displayed character were handled as an actual pet.

SUMMARY OF THE INVENTION

In view of the above problems, it is an object of the present invention to provide an image display device and method which is capable of displaying a character which is handled as a more realistic one.

In order to achieve the above the object, according to the present invention, there is provided an image display device comprising: image data storage means which contains a plurality of image data; selection commanding means operated by the user for giving the device a command to select image data to be displayed among from the plurality of image data contained in the image data storage means; selection count storage means for counting and storing the number of times of selection of each of the image data when the command to select and display that image data was given by the selection commanding means; determining means for determining whether the number of times of selection of that image data stored in the selection count storage means is larger than a predetermined value for each of the plurality of image data stored in the image data storage means; and display control means for displaying the image data, the number of times of selection of which is determined by the determining means as being larger than the predetermined value and the command to selection of which is given by the selection commanding means.

DESCRIPTION OF THE PREFERRED EMBODIMENTS

Embodiment of the present invention will be described below with reference to the drawings.

Figure 1:
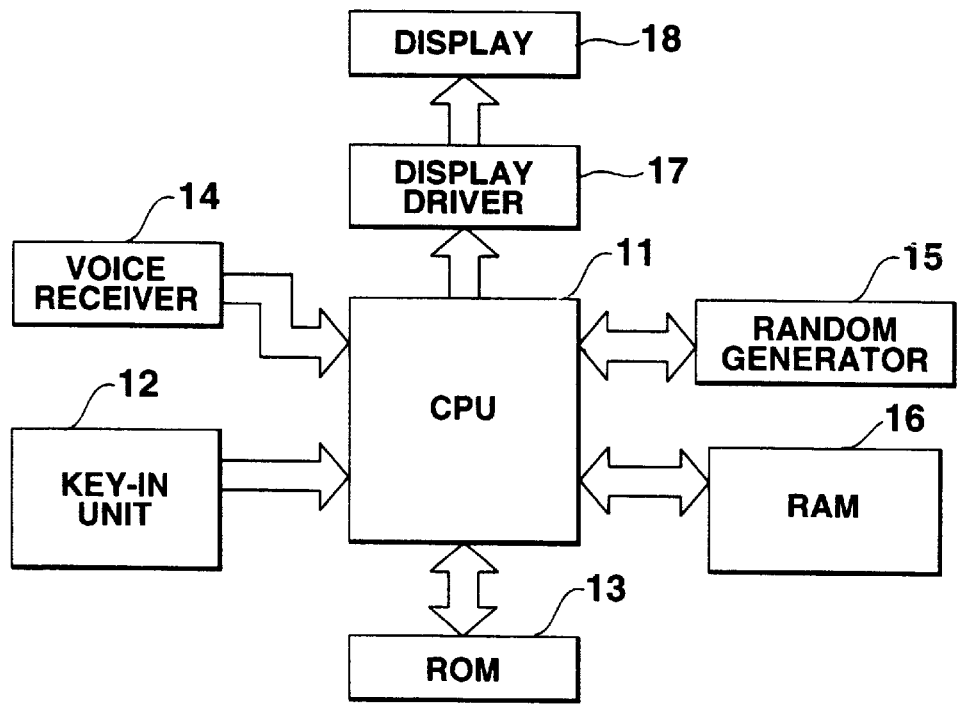
FIG. 1 is a block diagram indicative of the structure of an electronic circuit of an electronic notebook which includes a display device as a first embodiment of the present invention.

FIG. 1 is a block diagram indicative of the structure of an electronic circuit of an electronic notebook which includes a display device as a first embodiment of the present invention.

The notebook includes a CPU 11, which controls the respective operations of the circuit elements concerned in accordance with a system program contained beforehand in a ROM 13 which is started up in accordance with a key operation signal from a key-in unit 12. In addition to the key-in unit 12 and ROM 13, the CPU 11 is connected to a voice receiver 14, a random number generator 15 and a RAM 16.

The CPU 11 is also connected to a liquid crystal display 18 via a display driver 17.

The key-in unit 12 includes letter keys, a ten-key unit which are used to input a "name" and a "telephone number" to be registered as notebook data; a "mode" key used to select any one of a notebook mode and a pet mode; a "write" key operated to register into the RAM 16 the notebook data input in accordance with the operation of the letter keys and ten-key unit; and a "retrieval" key operated to retrieve and display the notebook data registered in the RAM 16 (those keys are not shown).

The ROM 13 contains a plurality of different image data in addition to the system program used to control the CPU 11.

The display image data contained in ROM 13 includes, for example, data on dog characters indicative of nine kinds of actions corresponding to commands; that is, "lie down", "lie on your back", "hold out your hand", "sit down", etc., in the form of a bit map.

The voice receiver 14 includes, for example, a microphone which receives the voice uttered by the user and supplies a corresponding voice signal to CPU 11 for voice recognition.

The random number generator 15 generates, for example, number data "1"–"9" randomly. The range of numbers to be generated, that is, whether a number should be generated in the whole range of "1"–"9" or in a partial range of "1"–"2" or "1"–"5" is determined in accordance with a command from the CPU 11.

Figure 2:
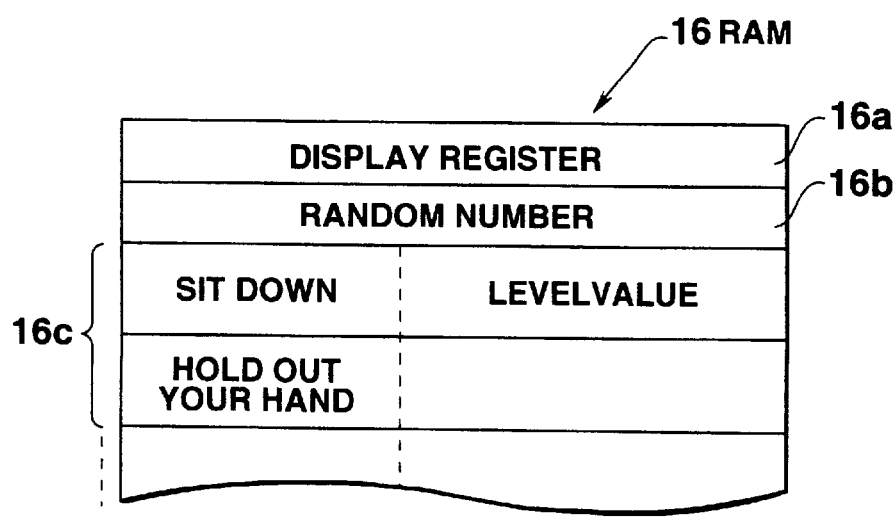
FIG. 2 shows the arrangement of registers provided in a RAM of the electronic notebook.

FIG. 2 shows the RAM 16 which includes a display register 16a into which data to be displayed on the display 18 is written as image data; a random number register 16b into which data generated by the random number generator 15 is written; action level registers 16c which stores data on nine kinds of action names of a dog character contained in the ROM 13 and the corresponding training levels; a notebook data register (not shown) into which notebook data such as "name" and "telephone number" input in the notebook mode is stored.

The liquid crystal display 18 displays either notebook data input in accordance with the operation of the letter keys and the ten-key unit or notebook data retrieved from the notebook registers of the RAM 16 in accordance with the "retrieval" key operation.

In the pet mode, at least one-dog character data contained in the ROM 13 is selectively read and displayed in accordance with a random number value written in the random number register 16b of the RAM 16 and the training level of a command corresponding action written into the action level register 16c.

The operation of the electronic notebook including the display device of the first embodiment will be described next.

Figure 3:
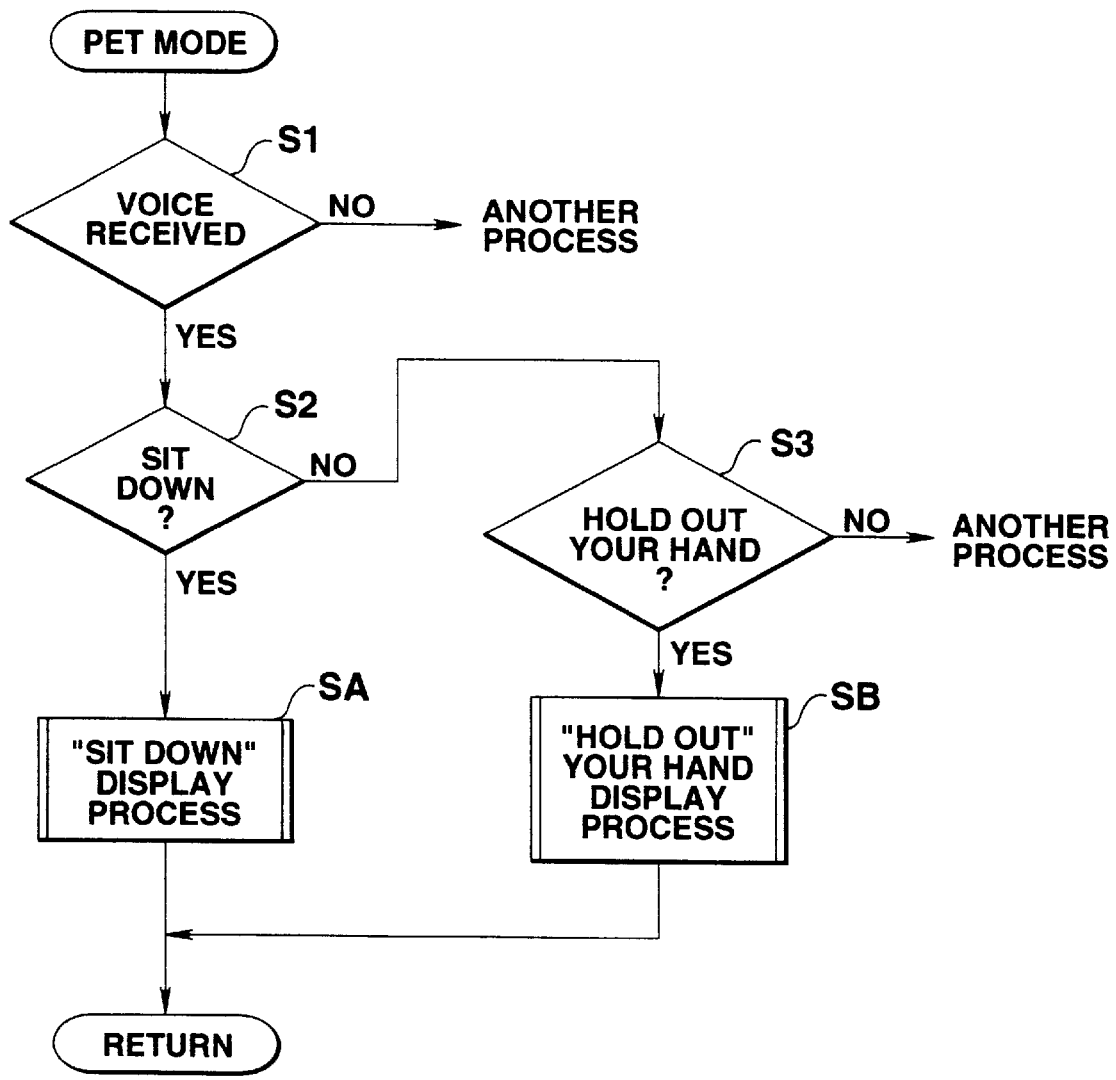
FIG. 3 is a flow chart indicative of a process performed in a pet mode in the electronic notebook.

FIG. 3 is a flow chart indicative of a process performed in the pet mode in this electronic notebook.

When the user's voice command such as "sit down" or "hold out your hand" given to the pet is received by the voice receiver 14 in a state where the pet mode has been set by the operation of the "mode" key of the key-in unit 12, the corresponding voice signal is supplied to CPU 11 for voice recognition (step S1).

When the voice command recognized by the CPU 11 is, for example, "sit down", a "sit down" display process is started up (step S2→SA). If the voice command is "hold out your hand", a "hold out your hand" display process is started up (step S2→SB).

Figure 4:
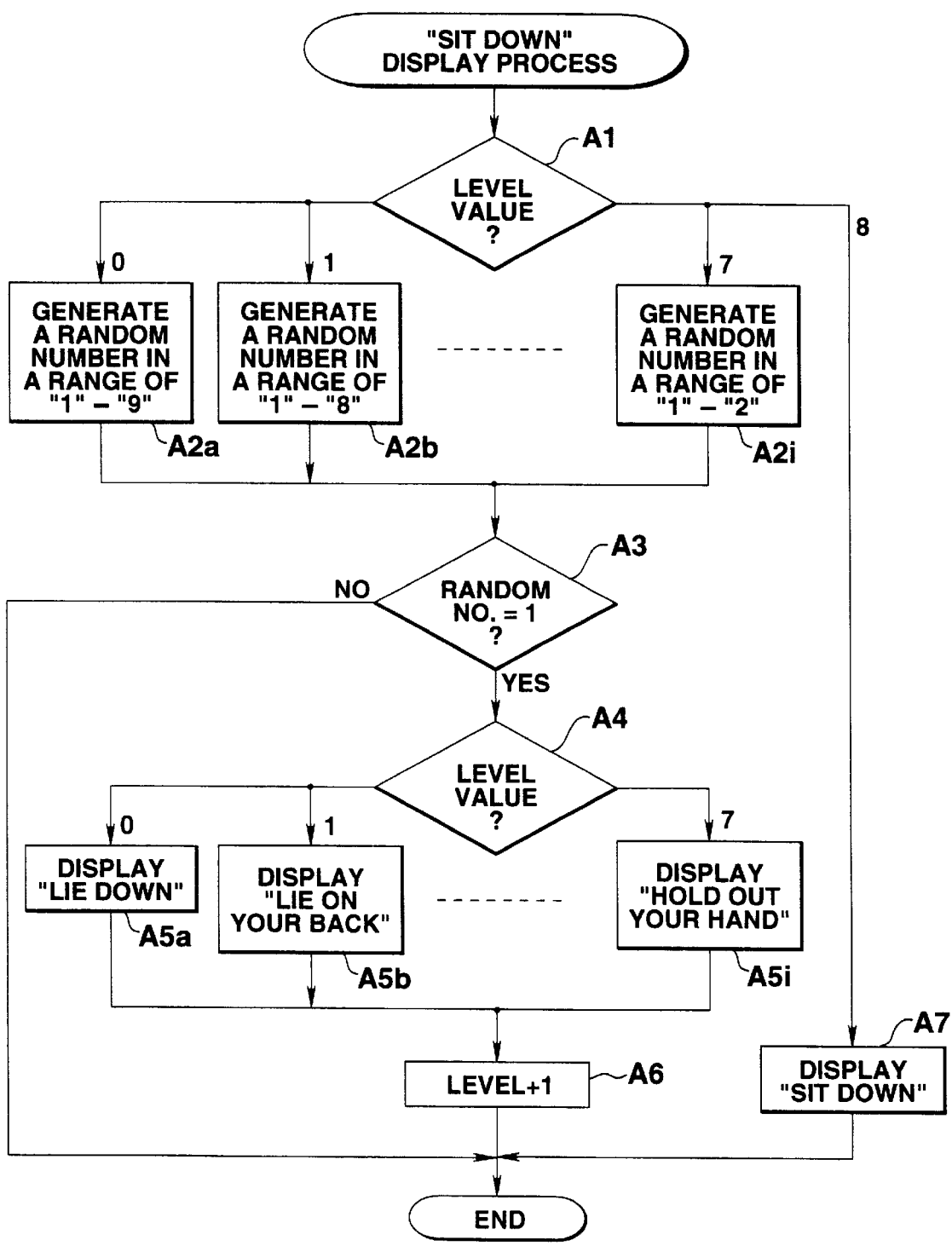
FIG. 4 is a flow chart indicative of a "sit down" display process performed in the pet mode in the electronic notebook.

FIG. 4 is a flow chart indicative of the "sit down" display process performed in the pet mode in the electronic notebook which includes the display device as the third embodiment.

Figure 5:
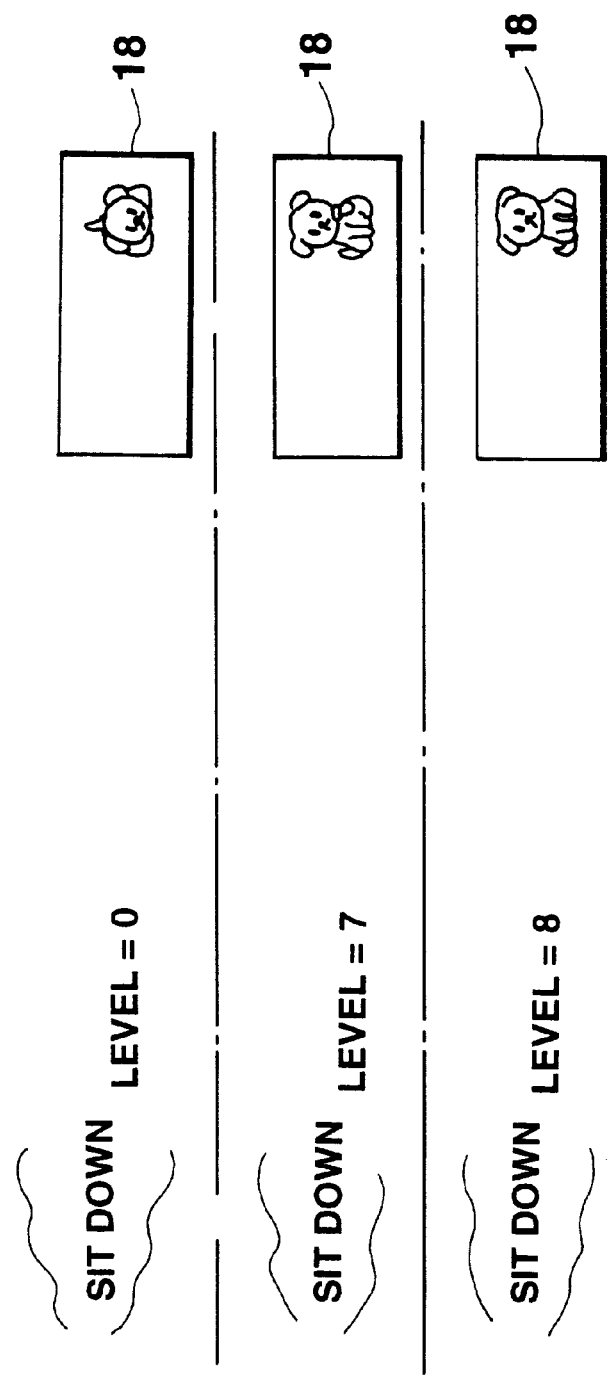
FIGS. 5A to 5C show displayed states of a dog character in the "sit down" display process.

FIGS. 5A to 5C show the displayed states of dog character data involved in the "sit down" display process in the electronic notebook.

When the "sit down" display process is started up in accordance with the user's voice command "sit down", first, the value of the training level set in correspondence to the command action "sit down" in the action level registers 16c of the RAM 16 is determined (step A1).

When the training level corresponding to the "sit down" is determined as "0", the random number generator 15 generates a random number in the range of "1"–"9", which is then written into the random register 16b and it is determined whether the random number is "1" (steps A1→A2a→A3).

When it is determined that the random number written into the random number register 16b is in the range of "2"–"9" and not "1", no processing is performed and then control returns to the initial state of the processing in the pet mode (step A3→END).

When (1) the user's repeated voice command "sit down" is received and recognized, (2) the "sit down" display process is stated up, and (3) it is determined that the training level corresponding to the "sit down" in the action level register 16c is still "0" (step A1→A2a), a random number in the range of "1"–"9" is generated from the random number generator 15. When it is then determined that the generated random number is "1", dog character data indicative of an action corresponding to the command "lie down" is (1) read from among the nine kinds of dog character action data stored beforehand in the ROM 13 in accordance with the determination that the training level corresponding to the "sit down" is "0", as shown in FIG. 5A, (2) written into the display register 16a of the RAM 16 and (3) displayed via the display driver 17 onto the display 18 (step A3→A4→A5a).

In response to this operation, the training level corresponding to the "sit down" in the action level register 16c is incremented by one and set at "1" (step A6).

Thereafter, the user's repeated command "sit down" is received and recognized, so that the "sit down" display process is start up, and it is determined that the training level corresponding to the "sit down" in the action level register 16c is "1" (step A1→A2b). Thus, when it is determined that a random number generated in the range of "1"–"8" is "1", dog character data indicative of an action corresponding to the command "lie on your back" is read from among the nine kinds of dog character action data stored beforehand in the ROM 13 in accordance with the determination that the training level corresponding to the "sit down" is "1", and written into the display register 16a of the RAM 16 and displayed via the display driver 17 onto the display 18 (step A3→A4→A5b).

In response to this operation, the training level corresponding to the "sit down" in the action level register 16c is incremented by "1" and set at "2" (step A6).

Thereafter, as the training level corresponding to the user's same voice command "sit down" repeated increases in order of "2"→"3"→"4", the range of random numbers generated is sequentially reduced in order of "1"–"7"→"1"–"6"→"1"–"5", so that the random number "1" is easy to obtain. Thus, when the user's voice command "sit down" is received and recognized in the state where the training level corresponding to the "sit down" has increased to "7", and it is determined that the training level corresponding to the "sit down" is "7", the random number generator 15 generates a random number in the range of "1"–"2", which number is then written into the random number register 16b, and it determined whether the random number is "1" (step A1→A2i→A3).

When it is determined that the generated random number is "1", dog character data indicative of an action corresponding to the command "hold out your hand" action is read from among the nine kinds of dog character action data stored beforehand in the ROM 13 in accordance with the determination that the training level corresponding to the "sit down" is "7", as shown in FIG. 5B, and written into the display register 16a of the RAM 16 and displayed via the display driver 17 onto the display 18 (step A3→A4→A5i).

In response to this operation, the training level corresponding to the "sit down" in the action level register 16c is incremented by one and set at "8" (step A6).

Thus, when the training level corresponding to "sit down" in the action level register 16c of the RAM 16 is set at "8", the voice command "sit down" is fixed as a command to the display of the dog character data indicative of an action corresponding to the command "sit down". In this situation, when the user's voice command "sit down" is again received and recognized, and, as shown in FIG. 5C, it is determined that the training level corresponding to the "sit down" is "8", the dog character data indicative of the action corresponding to the command "sit down" is (1) read from among the dog character data indicative of the nine kinds of actions stored beforehand in the ROM 13 beforehand, (2) written into the display register 16a of the RAM 16 and (3) displayed via the display driver 17 onto then display 18 (step A1a→A7).

Thus, the dog character, data on which is contained in the ROM 13, is trained as the dog character which "sits down" in obedience to the user's voice command "sit down".

Also, even when the voice command "hold out your hand" or "lie down" is given repeatedly in place of the "sit down", the "hold out your hand" or "lie down" display process similar to the "sit down" display process (FIG. 4) is started up. Thus, when the corresponding action training level in the action level register 16c reaches "8", the dog character which "holds out her hand" or "lie down" is selectively displayed and trained in obedience to the voice command "hold out your hand" or "lie down".

In summary, according to the electronic notebook which includes the display device of the first embodiment, when the user's voice commands "sit down", "hold out your hand", etc., is repeatedly received by the voice receiver 14, a random number is generated by the random number generator 15 set such that the range of random numbers generated is reduced in order of "1"–"9"→. . . →"1"–"2" in accordance with an increase in the training level of the corresponding action in the action level register 16c of the RAM 16, and written into the random number register 16b. Only when the generated random number is "1", the dog character data indicative of an action which does not correspond to the user's command is read from the ROM 13 and displayed on the display 18, the value of the training level corresponding to the user's command is incremented. When the training level reaches "8", the corresponding voice command is fixed and the corresponding dog character data is selected and displayed. Thus, there is no need for giving a command by the mechanical operation of the key-in unit unlike the case in the conventional image display device, but a dog character which, for example, "sits down" or "holds out her hand" in obedience to a user's voice command based on reality can be displayed via the respective stages of training to thereby greatly improve the interest of character display.

While in the first embodiment the arrangement is such that the training of the dog character is displayed by the non-contact operation based on the user's voice command, the arrangement may be such that the training of the dog character by the non-contact operation based on the user's hand gesture command is displayed.

By setting a different range of random numbers or a different range of training levels for each command, the degree of difficulty of training can be changed for each command such that, for example, the training for a simple command is easily achieved or otherwise the training for a difficult command can not be achieved easily, to thereby achieve more realistic training.

Figure 6:
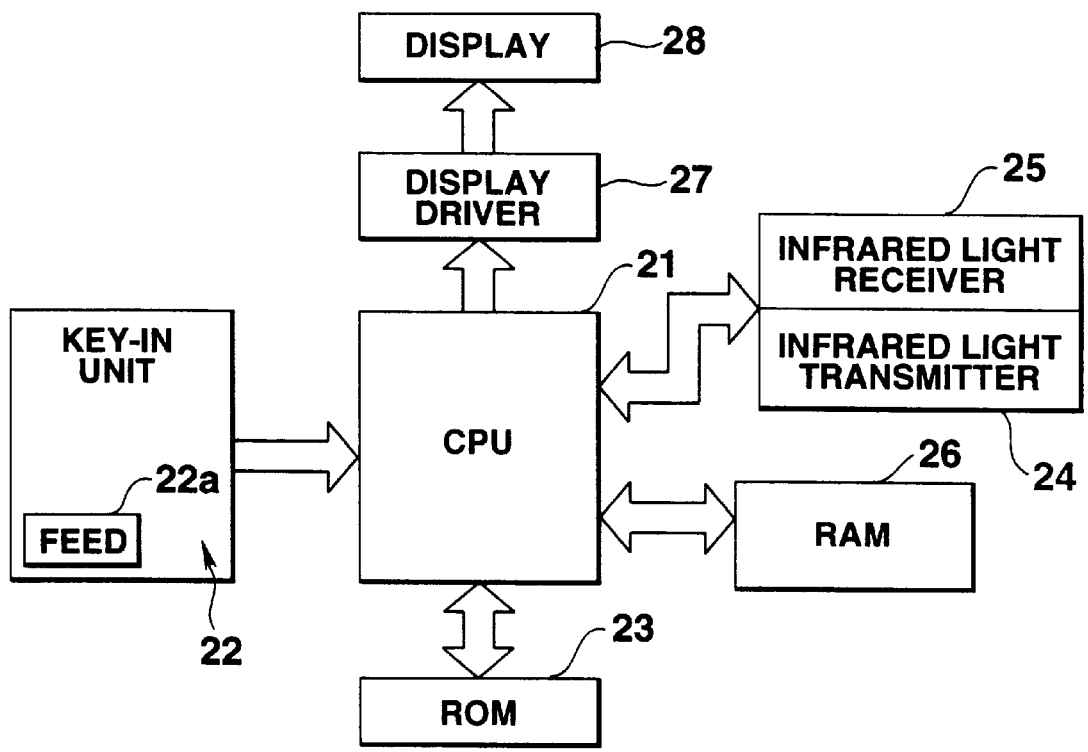
FIG. 6 is a block diagram indicative of the structure of an electronic circuit of an electronic notebook which includes a display device as a second embodiment of the present invention.

FIG. 6 is a block diagram indicative of the structure of an electronic circuit of an electronic notebook including a display device as a second embodiment of the present invention.

The electronic notebook includes a CPU 21 which controls the respective operations of the circuit elements concerned in accordance with a system program stored beforehand in a ROM 23 which is started up by a key operation signal from a key-in unit 22. In addition to the key-in unit 22 and ROM 23, the CPU 21 is connected to an infrared light transmitter 14, an infrared light receiver 25 and a RAM 26. The CPU 21 is also connected to a liquid crystal display 28 via a display driver 27.

The key-in unit 22 includes letter keys and a ten-key unit which are used to input a "name" and a "telephone number" to be registered as notebook data; a "mode" key used to select any one of a notebook mode and a pet mode; a "write" key operated to register into the RAM 26 the notebook data input in accordance with the operation of the letter keys and ten-key unit; and a "retrieval" key operated to retrieve and display the notebook data registered in the RAM 26 (those keys are not shown).

The key-in unit 22 also includes a "feed" key 22a operated when a dog character indicative of a desired action is displayed in accordance with the user's hand gesture command in the pet mode.

The ROM 23 contains a plurality of different image data in addition to the system program used to cause the CPU 21 to provide control operations of the elements concerned.

The display image data contained in ROM 23 includes a plurality of kinds of dog character's data indicative of a like number of actions corresponding to the commands, for example, "lie down", "lie on your back", "hold out your hand", "sit down", etc., in the form of a bit map.

The infrared light transmitter 24 includes a light emitting element which emits infrared light having a predetermined frequency in accordance with a command given by CPU 21 in the pet mode.

The infrared light receiver 25 includes a photodetector which receives external infrared light in the pet mode and supplies a corresponding photodetection signal to CPU 21.

Figure 7:
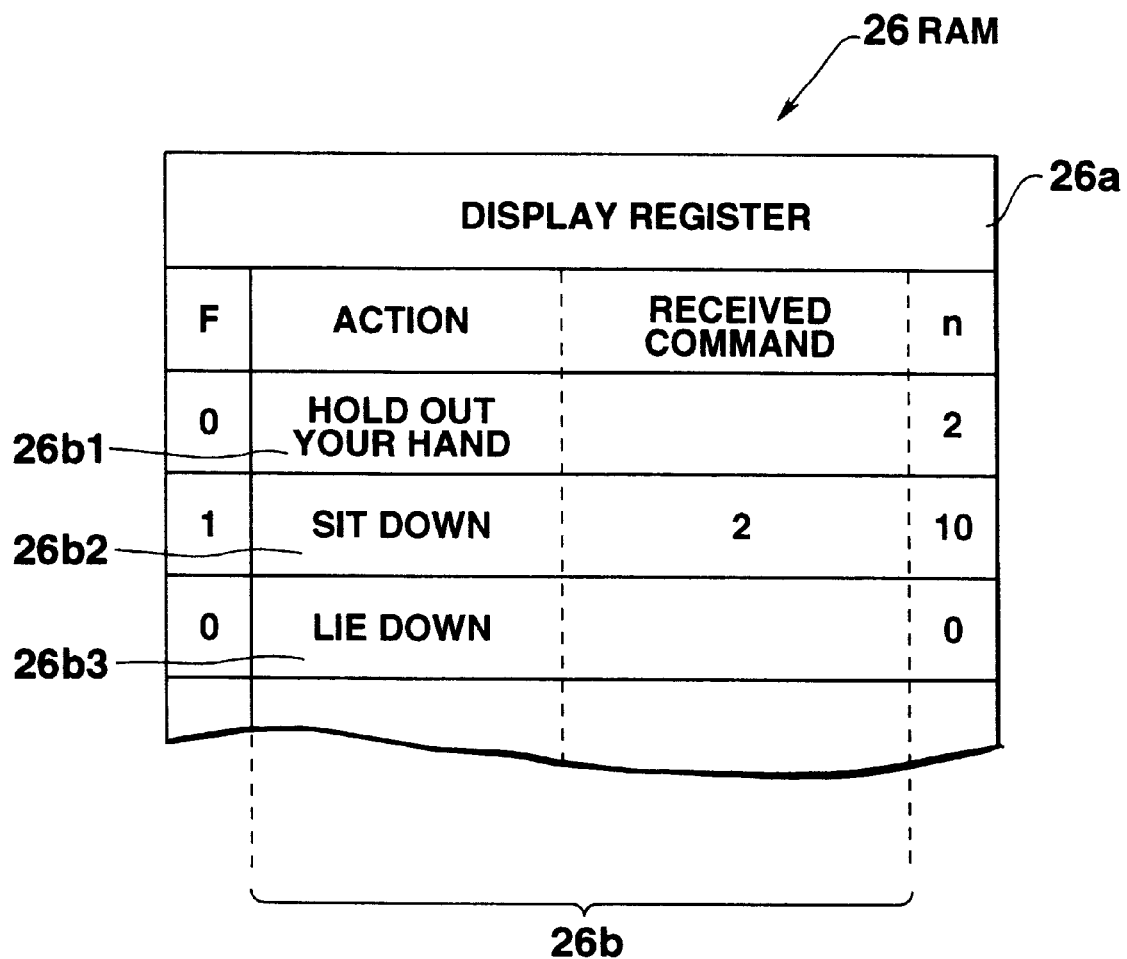
FIG. 7 shows the arrangement of registers provided in a RAM of the electronic notebook which includes the display device as the second embodiment.

FIG. 7 shows the arrangement of registers in the RAM 26 of the electronic notebook which includes the display device as the second embodiment.

RAM 26 includes a display register 26a into which display data to be displayed on the display 28 is to be written as image data; action command registers 26b which store data on a plurality of kinds of action names of the dog character as is stored in the ROM 23 and the corresponding received commands (the number of times of receipt of infrared light per predetermined time in the infrared light receiver 25); corresponding training level registers n each counted up due to the operation of the "feed" key 22a when the dog character indicative of its action corresponding to one of the action names stored in the action command registers 26b is displayed; command fixing flag registers F in each of which a flag which indicates the fixation of a received command is set when the training level "10" is set in the corresponding training level register n in correspondence to the action name stored in the action command register 26b concerned; and a notebook data register (not shown) in which notebook data such as "name" and "telephone number" is recorded.

The display 28 displays one of notebook data input in accordance with the operation of the letter keys and ten-key unit in the notebook mode or notebook data retrieved from the notebook data registers of RAM 26 in accordance with the operation of the "retrieval" key.

In the pet mode, data on at least one of the dog character actions contained in the ROM 23 is selectively read and displayed in accordance with the received command corresponding to the number of times of receipt of infrared light by the infrared light receiver 25.

The operation of the electronic notebook including the display device of the second embodiment will be described next.

Figure 8:
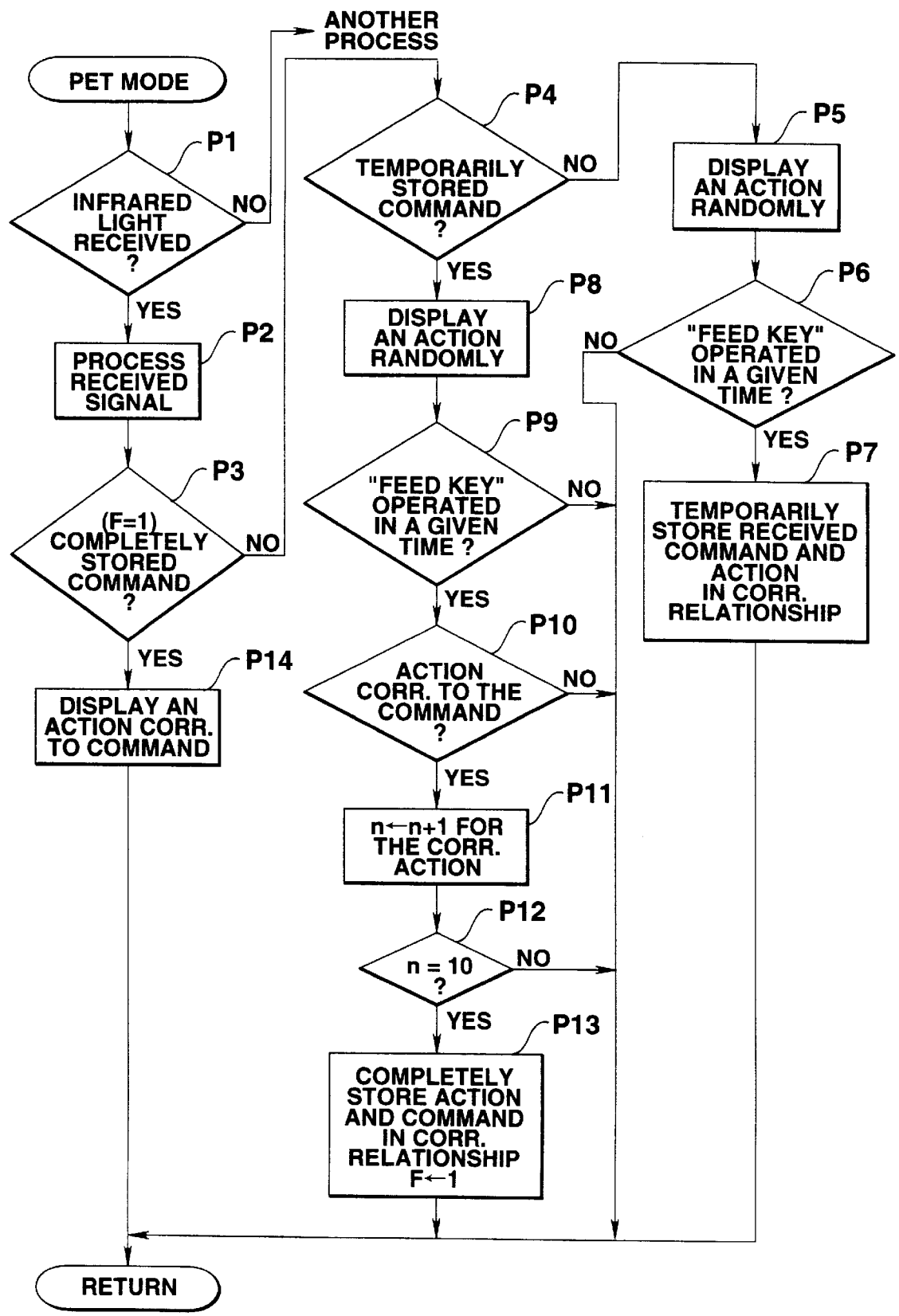
FIG. 8 is a flow chart indicative of a process performed in a pet mode in the electronic notebook which includes the display device as the second embodiment.

FIG. 8 is a flow chart indicative of a process performed in the pet mode in the electronic notebook including the display device of the second embodiment.

FIGS. 9A to 9D show the displayed states of dog character data involved in the processing in the pet mode in the electronic notebook of the second embodiment.

When the CPU 21 is set in the pet mode by the operation of the "mode" key of the key-in unit 22, infrared light is emitted from the infrared light transmitter 24.

Figure 9A:
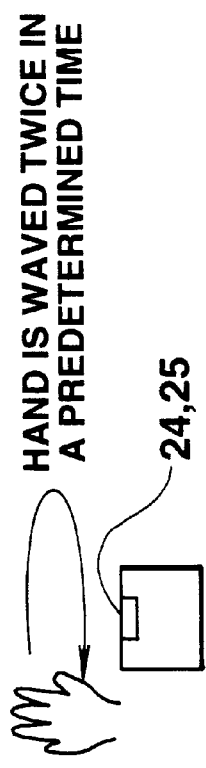
FIGS. 9A to 9D show displayed states of a dog character involved in the process in the pet mode in the electronic notebook which includes the display device as the second embodiment.

As shown in FIG. 9A, if the user's hand is waved twice in the non-contact manner (that is, the user makes two hand gestures) before the light emitting element of the infrared light transmitter 24 in a predetermined time as a command "sit down" to a dog character, data on which is stored in the ROM 23 for training purposes, the infrared light emitted from the transmitter 24 is reflected by the user's hand and received by the receiver 25 each time the user's hand is passed and the two resulting received light signals are delivered to CPU 21 (step P1→P2).

In response to this operation, it is determined whether the received command "2" corresponding to the number of times of receipt of the infrared light is the fixed one in the action command register 26b for which a flag "1" is set in the corresponding command fixing register F of RAM 26 (step P3).

In this case, in the initial processing in the pet mode, no action commands are stored in the action command registers 26b and no flags are set in the corresponding command fixing registers F either, so that when it is determined that the user's hand gesture command "2" is not fixed, it is determined whether the hand gesture command "2" was once stored as a non-fixed command for some action although the command fixing flag "1" has not been set now (step P3→P4).

If not, the dog character data indicative of different actions contained in the ROM 23 is randomly selected and read out and written into the display register 26a of RAM 26 and displayed via the display driver 27 onto the display 28 (step P4→P5).

When by the random selection and display of the dog character data, no "sitting down" dog character which the user desires to train as her hand gesture command "2" is displayed, but, for example, data on a dog character which "holds out her hand" is displayed, and if no operations are performed in a predetermined time, the control returns to the respective infrared light emission and receipt waiting states in the infrared light transmitter 24 and receiver 25 (step P6→RETURN).

Figure 9B:

As shown in FIG. 9B, by user's performing the two hand-gesture operations repeatedly, the emission/receipt of the infrared light is performed in a manner similar to that mentioned above. When it is determined that the hand gesture command "2", although fixed by the command fixing flag F, is not the one stored temporarily as a non-fixed command, the plurality of dog character data indicative of actions stored in the ROM 23 is randomly selected and read, written into the display registers 26a of the RAM 26 and displayed via the display driver 27 on the display 28 (steps P1–P5).

When the "sitting down" dog character which the user desires to train as the hand gesture command "2" is displayed by the random selection and display of the dog character data, and the "feed" key 22a is operated in the predetermined time, a received command is stored as "2" in correspondence to the "sit down" received command register 26$b_2$ of the action command registers 26b in the RAM 26 (step P6→P7).

Although the emission and receipt of the infrared light is performed in a manner similar to that mentioned above, by the user's two hand gestures, and it is determined that the hand gesture command "2" is not fixed in the command fixing flag F and if it is determined that the hand gesture command "2" is the one stored temporarily as the non-fixing command in the "sit down" received command register 26$b_2$ of the action command registers 26b, one of the plurality of dog character action data stored in the ROM 23 is randomly selected, read out and written into the corresponding display register 26a of the RAM 26 and displayed on the display 28 via the display driver 27 (steps P1–P4→P8).

When the "sitting down" dog character which the user desires to train as her hand gesture command "2" by this random selection and display of the dog character data is displayed, and the "feed" key 22a is operated in the predetermined time, it is determined and recognized on the basis of the relationship in correspondence between the received command and the action name in the "sit down" received command register 26$b_2$ of the action command register 26b that the action of the dog character displayed on the display 28 corresponds to the received command "sit down", and the value of the corresponding training level register n is incremented by one to become "1" (step P9→P10→P11).

In response to this operation, it is determined whether the incremented value of the training level register n corresponding to the "sit down" received command register 26$b_2$ has reached "10" or the command fixing level. If not, the control returns to the respective infrared light emission and receipt waiting states in the infrared light transmitter 24 and receiver 25 (step P12→RETURN).

Thereafter, when the user further makes a command gesture twice, and the user operates the "feed" key 22a each time the "sitting down" dog character corresponding to the action for which the user desires to train the dog character is displayed, the level value of the training level register n corresponding to the "sit down" receipt command register 26$b_2$ is incremented repeatedly. Thus, its training level value increases in order of "2"→"3"→"4". . . (steps P1–P4→P8–P12→RETURN).

Figure 9C:

As shown in FIG. 9C, if a "lying down" dog character which does not correspond to an action for which the user desires to train the dog character is displayed by the random selection of the dog character when the user further makes the command gesture twice, it is determined that no "feed" key 22a is operated. Thus, the control returns directly to the respective infrared light emission and receipt waiting states in the infrared transmitter 24 and receiver 25 (steps P1–P4→P8, P9→RETURN).

If the "feed" key 22 is operated wrongly when the "lying down" dog character which does not correspond to the action for which the user desires to train the dog character is displayed, as shown in FIG. 9C, it is determined on the basis of the relationship in correspondence between the received command and the action name in the "sit down" received command register 26$b_2$ of the action command register 26b that the action of the dog character displayed on the display 28 is the action "lie down" which does not correspond to the received command. Thus, the level value of the corresponding training level register n is not incremented and the control returns again to the respective infrared light emission and receipt waiting states in the infrared light transmitter 24 and receiver 25 (step P1–P4→P8–P10→RETURN).

Thereafter, when the user further makes the command gesture twice repeatedly and operates the "feed" key 22a each time the "sitting down" dog character corresponding to the action to be trained is displayed, the level value of the training level register n corresponding to the "sit down" reception command register $26b_2$ is incremented repeatedly. When it is determined that the training level value has reached the command fixing level "10", the corresponding command fixing flag register F is set at "1" and the received command "2" involved in the user's hand gestures is fixed as the command "sit down" (steps P1–P4→P8–P13).

Thus, the result is that the dog character, data on which is stored in the ROM 23, has been trained so as to "sit down" in obedience to the user's two-hand gesture command.

Figure 9D:

As shown in FIG. 9D, when the user performs her two hand gesture operations, and the infrared light sent from the infrared light transmitter 24 is reflected twice in a predetermined time and received by the infrared light receiver 25, the received command "2" is determined to be a fixed one because the command fixing flag "1" is set in the command fixing flag F corresponding to the received command register $26b_2$ in which the reception command "2" is stored. Thus, data on the "sitting down" dog character is selectively read in correspondence to the fixing command "2" from among the plurality of kinds of different dog character data contained in the ROM 23 and the corresponding dog character is displayed on the display 28 (steps P1–P3→P14).

In summary, according to the electronic notebook which includes the display device as the second embodiment, when the infrared light receiver 25 receives a reflection of the infrared light involved in the user's hand gesture command, any one of the plurality of different dog character data stored beforehand in the ROM 23 is read randomly and displayed on the display 28. When a dog character indicative of the desired action is displayed and the "feed" key 22a of the key-in unit 22 is operated, the count of receipt of the infrared light depending on the hand gesture command is stored as the command to the desired action in the corresponding action command register 26b of the RAM 26, and the training level of the corresponding training level register n is counted up. When the training level n reaches "10" by the random display of a dog character indicative of the desired action based on the repetition of similar hand gesture commands and the repeated operation of the "feed" key 22a, the flag "1" is set in the corresponding command fixing register F, so that the hand gesture command is fixed as the user's desired action command for the dog character and thereafter, the dog character indicative of the action obeying that action command is selected and displayed. Thus, no commands are required to be given by the mechanical operation of the key-in unit as is done in the conventional image display device. By the user's hand gesture command like a realistic one, the dog character, which, for example, "sits down" or "holds out her hand" can be stored by selective training and displayed to thereby greatly improve the fun of displaying a character.

While in the second embodiment the presence of the non-contact operation by the user's hand is detected, using a reflection of the infrared light emitted from the device proper, arrangement may be such that, for example, by-hand interruption of external light, by-hand reflection of sound waves (for example, ultrasonic waves) emitted by the device proper, by-hand interruption of external sound waves or changes in the magnetism produced from a magnetic material held by the user's hand is sensed and the image displayed on the display of the display device proper is changed and displayed in accordance with the expression of the user's intention and command by the user's hand gesture without contacting with the device proper.

While in the respective embodiments the image displayed on the display is selected and displayed in accordance with the non-contact operation such as a voice command or a gesture command, different control, for example, including changing the mechanical operations in the device proper may be employed in the image display as well as other processes.

What is claimed is:

1. An image display device comprising:

image data storage means for storing a plurality of image data;

selection commanding means operable by a user for giving the device a command to select image data to be displayed from among the plurality of image data stored in the image data storage means;

selection count storage means for counting and storing a number of times of selection of each of the image data;

determining means for determining whether the number of times of selection of each image data stored in the selection count storage means is larger than a predetermined value for each of the plurality of image data stored in the image data storage means; and display control means for displaying image data whose number of times of selection is determined by the determining means as being larger than the predetermined value and whose selection has been commanded by the selection commanding means;

wherein the selection count storage means comprises:

random number generating means for generating a random number when the selection commanding means gives the command to select the image data from among the image data stored in the image data storage means for displaying purposes; and random number counting means for counting and storing the number of times of selection of each of the image data corresponding to the particular value only when the random number generated by the random number generating means has a particular value.

2. An image display device according to claim 1, wherein the selection commanding means comprises non-contact selection commanding means for enabling the user to command the selection of the image data without contacting the device.

3. An image display device according to claim 2, wherein the non-contact selection commanding means comprises:

sending means for sending infrared light;

receiving means for receiving a reflection of infrared light sent by the infrared light sending means, the reflection being produced by an action of the user; and selection command executing means for executing the command to select the image data stored in the image data storage means depending on a receipt state of the reflection of the infrared light in the receiving means.

4. An image display device according to claim 2, wherein the non-contact selection commanding means comprises:

voice receiving means for receiving a voice;

voice recognizing means for recognizing the voice received by the voice receiving means; and recognition commanding means for executing the command to select the image data stored in the image data storage means based on the recognition by the voice recognizing means.

5. An image display device according to claim 1, wherein the display control means further comprises:

random display means for selecting and displaying image data randomly from among the plurality of image data stored in the image data storage means when the selection commanding means gives the command to select the image data, the stored number of times of selection of which is determined by the determining means as not being the predetermined value.

6. An image display device according to claim 5, wherein the random display means comprises:

count checking means for checking the number of times of selection stored by the selection count storage means; and random control means for limiting a range of the image data to be selected randomly from among the image data stored in the image data storage means in accordance with a result of the checking of the count checking means.

7. An image display device according to claim 1, wherein the random number generating means comprises:

random number control means for controlling a range of random numbers to be generated in accordance with the number of times of selection of each of the image data counted by the random number counting means, said random number control means increasing a probability of generation of the particular value as the number of times of selection counted by the random number counting means increases.

8. An image display device according to claim 1, wherein the image data storage means comprises image data storage means for storing a plurality of image data on various actions of an animal character; and the selection commanding means comprises selection instructing means for giving a command to an animal character, data on which is stored in the image data storage means.

* * * * *